United States Patent [19]

Gebeke et al.

[11] Patent Number: 4,642,722
[45] Date of Patent: Feb. 10, 1987

[54] SPRING MECHANISM FOR LID OF VIDEO CASSETTE

[75] Inventors: Charles D. Gebeke, White Bear Lake; Mark W. Weavers, Little Canada, both of Minn.

[73] Assignee: Minnesota Mining and Manufacturing Company, Saint Paul, Minn.

[21] Appl. No.: 577,777

[22] Filed: Feb. 7, 1984

[51] Int. Cl.[4] .................... G11B 23/02; G11B 23/04; G11B 15/32; G03B 1/04
[52] U.S. Cl. .................................... 360/132; 242/198
[58] Field of Search .............................. 306/132, 137; 242/197-199

[56] References Cited

U.S. PATENT DOCUMENTS

| | | | |
|---|---|---|---|
| 4,358,070 | 11/1982 | Okamura et al. | 242/197 |
| 4,418,373 | 11/1983 | Fujimori et al. | 360/132 |
| 4,466,583 | 8/1984 | Giannis et al. | 242/198 |
| 4,484,248 | 11/1984 | Ogiro et al. | 360/132 |
| 4,494,161 | 1/1985 | Ogata et al. | 360/132 |
| 4,518,135 | 5/1985 | Gebeke | 242/199 |

FOREIGN PATENT DOCUMENTS

| | | |
|---|---|---|
| 0097964 | 11/1984 | European Pat. Off. ............ 360/132 |
| 3302392 | 8/1983 | Fed. Rep. of Germany . |
| 3328299 | 2/1984 | Fed. Rep. of Germany . |
| 2508223 | 12/1982 | France . |
| 2068334 | 8/1981 | United Kingdom . |
| 2102386A | 2/1983 | United Kingdom . |
| 2134485 | 8/1984 | United Kingdom . |

OTHER PUBLICATIONS

"Specification for 8 mm Video Cassette", Mar. 1983, from the Electronic Industries Association of Japan.

Primary Examiner—Robert S. Tupper
Assistant Examiner—Melissa J. Koval
Attorney, Agent, or Firm—Donald M. Sell; James A. Smith; William L. Huebsch

[57] ABSTRACT

Spring mechanism for biasing a visor-type lid of a cassette includes a coil spring which fits around a pin that journals the lid to the cassette. One end of the spring has a bent portion which is compressed into a well formed in the cassette such that the tip of the bent portion digs into a surface portion of the well and thus resists removal.

15 Claims, 8 Drawing Figures

SPRING MECHANISM FOR LID OF VIDEO CASSETTE

FIELD OF THE INVENTION

The invention concerns a spring mechanism for biasing a visor-type lid of a video cassette toward the closed position.

BACKGROUND ART

"Specifications for 8 mm Video Cassette" dated March 1983 have been distributed by Electronic Industries Association of Japan. Like previous video cassettes, the specifications call for magnetic recording tape extending along the open front of the cassette when not in use. That extent of tape is enclosed during storage between a main visor-type lid and a smaller auxiliary lid which are automatically unlocked and retracted when the cassette is positioned on a tape deck.

U.S. Pat. No. 4,418,373 (Fujimori et al.) shows a video cassette which should substantially meet those March 1983 specifications. Fujimori FIGS. 3-6 show a pair of coil springs 19 which bias the main lid or front cover 14 toward the closed position and also indirectly the auxiliary lid or inner cover 34.

United Kingdom Patent Application No. 2,102,386A, published Feb. 2, 1983, shows a precursor of the 8 mm video cassette. FIG. 7 shows a main visor-type lid 20 which partially surrounds a tape 9 and a smaller auxiliary lid 37 which completes the enclosure during storage. Partial and complete retraction are shown in FIGS. 8 and 9, respectively. In the March 1983 specifications, the main lid covers only the outer face of the tape, and the auxiliary lid covers the entire inner face of the tape, as shown in the Fujimori patent.

The cassette of the Fujimori patent may be difficult to assemble because of the manner of securing the ends 19b of the coil springs 19. It is believed that this difficulty has been addressed by a cassette designed by Fuji Photo Film Co. to meet the March 1983 specifications. The spring mechanism of that Fuji cassette is shown in FIGS. 1 and 2 of the drawing of the present application. Referring thereto, the main visor-type lid 10 has a corner part 12 from which projects a pin 14 that is journalled in an opening in an offset 16 of a sidewall 18 of the cover or upper shell 20 of the Fuji cassette. Fitting around the pin 14 is a coil spring 22, one end of which fits into an undercut in an L-shaped projection 23 from the corner part 12 as seen in FIG. 2 which shows the inner face of the corner part 12 prior to sub-assembly of the lid 10 and the cover shell 20. The free end of the spring 22 is temporarily retained under tension by an undercut in a protrusion 25 from the corner part 12, which protrusion also serves as a latch for the lid. During assembly of the lid and cover shell, the free end of the spring 22 is moved out of the undercut in the protrusion 25 and permanently attached to the cover 20 by deforming a projection 26 over the end of the spring. While this spring mechanism should be easy to assemble, it involves some hazards. The magnetizable face of a magnetic recording tape travelling along the path 28 might touch the spring and thus be scratched, especially if there is a burr at the end of the spring. If the spring contains any magnetism, it might partially erase the tape. Deformation of the projection 26 might produce a plastic burr which could scratch the tape.

THE PRESENT INVENTION

In the present invention a visor-type cassette lid has a reliable, economical spring mechanism which avoids the aforementioned problems. Like the aforementioned Fuji cassette, the cassette of the invention includes a visor-type lid having an ear or corner part at which the lid is pivotably journalled by a pin to a sidewall of the cassette, and a coil spring around the pin biases the lid toward the closed position. The novel cassette differs from the Fuji cassette in that formed at said sidewall is a well having an opening receiving a bent portion of a free end of the coil spring, which bent portion is compressed between opposing interior surface portions of the well. The tip of the bent portion contacts one of said surface portions at an obtuse angle in the direction of the rim of said opening. Because of the compression, the tip of the bent portion tends to dig into the surface of the well, and the digging in tends to be amplified under any force tending to withdraw the spring from the well.

A typical cassette comprises base and cover shells, each having a broad facewall and short sidewalls which abut to form a tape-reel enclosure. The main lid of the 8 mm video cassette is sub-assembled with the cover shell before attaching the base shell. Hence, in an 8 mm video cassette embodying the present invention, the well may be formed as an extension of a sidewall of the cover shell. Formed in the rim of the opening of the well is a depression into which the spring is loosely fitted during sub-assembly of the lid and cover shell. The depression can help in guiding the bent portion of the spring into the well during sub-assembly of the lid and cover shell, especially if it extends across the full width of the well. Preferably upon final assembly, part of the base shell, such as the lid lock, loosely entraps the spring in the depression.

It may be sufficient to replace the well with a structure including a surface portion facing away from the pin around which the spring is coiled. A free end of the spring is bent and extends over the rim of said structure, the tip of the bent portion contacts said surface portion at an obuse angle in the direction of the rim of said structure, and the spring is under tension between the tip and said pin. However, a well which compresses the bent portion should provide for greater reliability during assembly.

THE DRAWING

In the drawing:

FIGS. 1 and 2 schematically illustrate a spring mechanism for a visor-type lid of a video cassette of the prior art and are discussed above under "Background Art";

FIG. 3 is a schematic plan view of a video cassette embodying the invention, partially cut away;

FIG. 4 an enlarged fragmentary plan view from the underside of a sub-assembly of the cover shell and lid of the cassette of FIG. 3;

DETAILED DESCRIPTION

Figure 3:
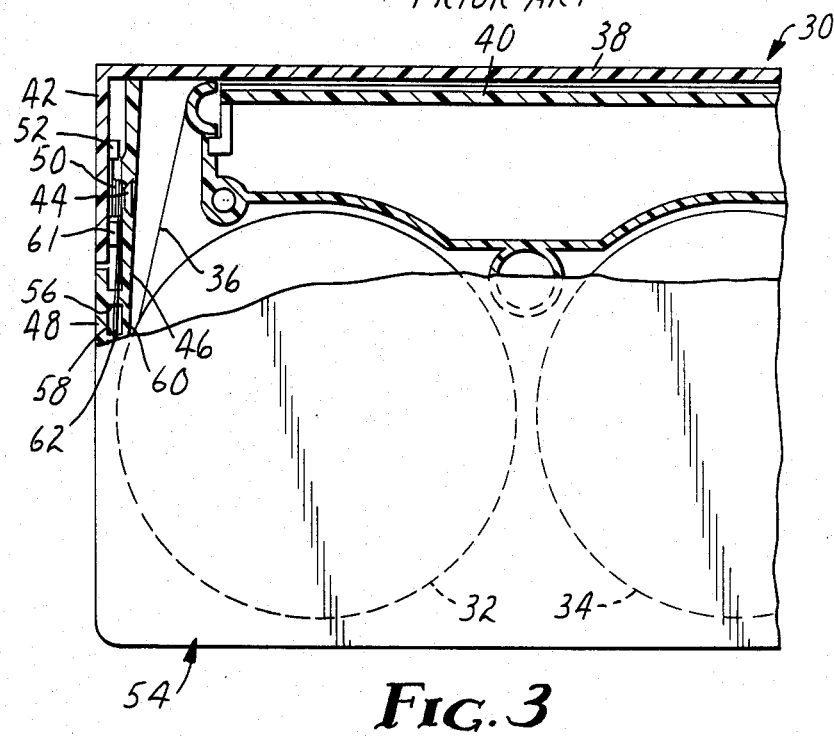

In FIG. 3, a video cassette 30 includes a pair of reels 32, 34 between which a magnetic recording tape 36 extends. When the cassette is being stored, the tape 36 extends along the open front of the cassette between a main visor-type lid 38 and a smaller auxiliary lid 40. The main lid 38 has a pair of ears or corner parts, one of which 42 is shown in FIG. 3. Projecting from the corner part 42 is a pin 44, which fits into offset 46 of a sidewall 48 of the cover shell 54 of the cassette 30, thus pivotably journalling the main lid to a sidewall of the cassette.

Figure 4:
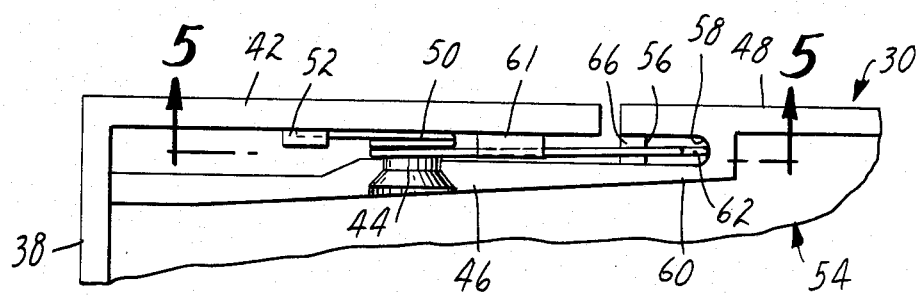
Figure 5:
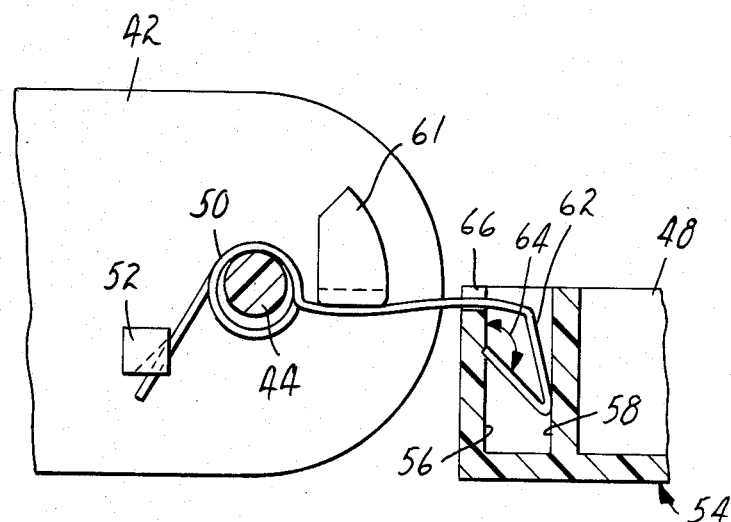
FIG. 5 is a cross-section along line 5—5 of FIG. 4.

As better seen in FIGS. 4 and 5, a spring 50 is coiled around the pin 44, and one end of the spring fits into an undercut in an L-shaped projection 52 from the corner part 42. At the other end of the spring 50, the cover shell 54 is formed with an elongated well, one narrow flat interior surface portion 56 of which faces away from the pin 44 while a narrow semi-cylindrical opposing of the well faces the pin 44. The rim 60 of the well lies in a plane which extends substantially perpendicular to the adjacent sidewall 48.

Before sub-assembling the main lid 38 and cover shell 54, the spring is held by undercuts in the projection 52 and a protrusion 61 from the corner part 42. In making that sub-assembly, the spring is pushed out of the undercut of the protrusion 61, and its bent portion 62 is pushed into the well. This compresses the bent portion between the opposing surface portions 56 and 58, whereupon the tip of the spring tends to dig into the surface portion 56 at an angle 64 of about 135° in the direction of the opening of the well at its rim 60. Any force applied to the spring between the bent portion 62 and the pin 44 toward the pin 44 would only cause the tip of the spring to dig further into the surface portion 56 and thus become more secure.

There is a depression 66 in the rim 60 of the well into which the spring 50 loosely fits. When the cassette 30 is assembled, part of the base shell loosely entraps the spring 50 in the depression 66.

The surface portion 58 of the well may be unnecessary during sub-assembly of the lid and cover shell if the spring 50 is under tension between its bent portion 62 and the pin 44, and is completely unnecessary after assembly where the base shell of the cassette entraps the spring as disclosed in the preceding paragraph.

While the tip of the bent portion 62 as shown in FIG. 5 contacts the surface portion 56 at an angle of about 135°, it should be secure against slippage at any angle between 110° and 160°, although an angle between 125° and 145° would give an even better assurance that the tip stays in place during assembly.

Figure 6:
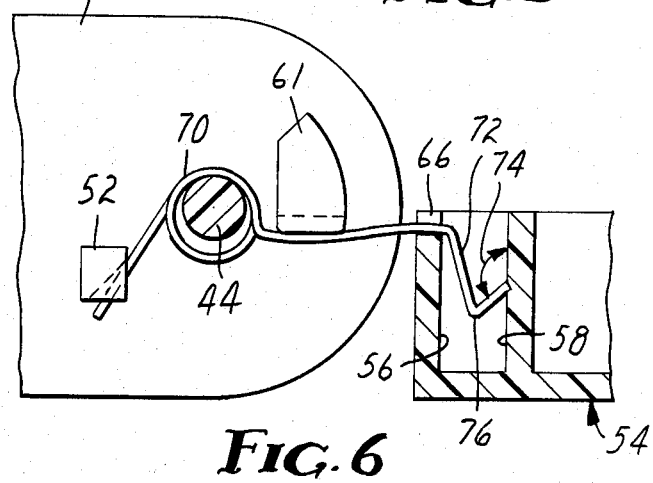
FIG. 6 is a cross-section similar to that of FIG. 5 except employing a different coil spring.

The cassette shown in FIG. 6 is identical to that of FIGS. 3-5 except that the bent portion 72 of its coil spring 70 has a different configuration compared to that of the spring 50, and its tip contacts the interior surface portion 58 at an angle 74 of about 135° in the direction of the opening of the well at its rim 60. The central angle 76 of the bent portion 72 enhances the guiding of the bent portion into the well, thus permitting the opening at the rim 60 of the well to be very small.

Among feasible changes in the design of the video cassette and springs shown in FIGS. 3-6, their bent portions 62 and 72 (FIGS. 5 and 6, respectively) could be gently curved where they change directions.

Figure 2:
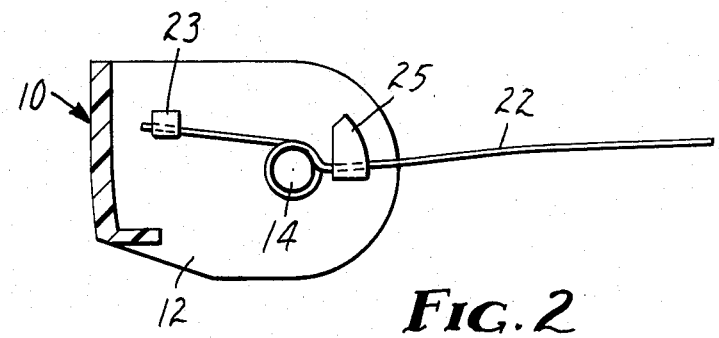
Figure 1:
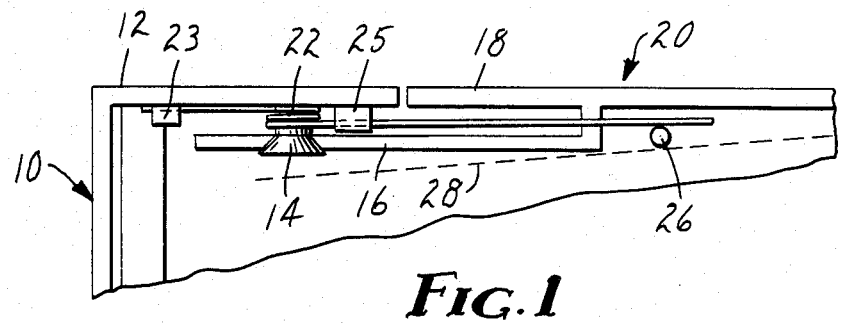
Figure 7:
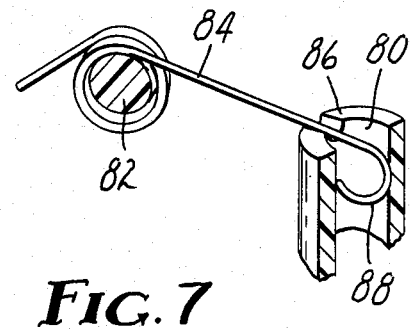
FIG. 7 is a schematic perspective view of another spring mechanism of the invention.

The spring mechanism of FIG. 7 is similar to that shown in FIGS. 2-4 except that the well has been replaced by a structure formed in the cover shell and having a semi-cylindrical surface portion 80 which faces away from the pin 82 on which the spring 84 is coiled. A free end of the spring extends over the rim 86 of the structure and has a bent portion 88, the tip of which contacts the surface portion 80 at an angle of about 135° in the direction of the rim 86 of the structure. The spring 84 is under tension between its tip and said pin 82, thus causing the tip to tend to dig into the surface portion 80 and to remain in place during sub-assembly of the lid and cover shell.

The semi-cylindrical surface portion 80 could be replaced by a flat surface portion.

Figure 8:
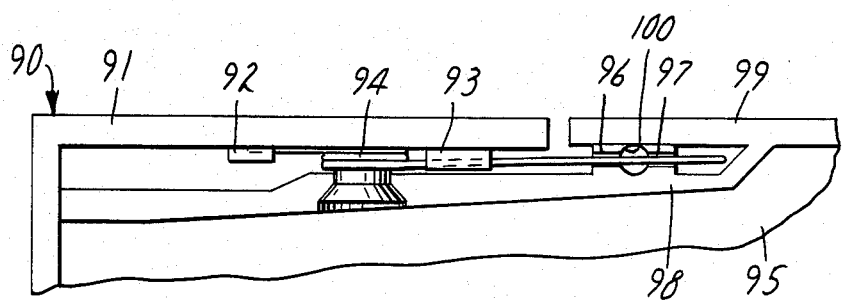
FIG. 8 is a fragmentary plan view from the underside of a sub-assembly of another cover shell and lid.

The sub-assembly shown in FIG. 8 includes a lid 90 having an ear of corner part 91 including a projection 92 and a protrusion 93, both of which are undercut to hold the ends of a coil spring 94. Upon sub-assembly of the lid 90 and a cover shell 95, one end of the spring 94 is laid into depressions 96 and 97 of an offset 98 of a sidewall 99. The end of the spring lies across a well, the interior 100 of which is nearly cylindrical, but of slightly larger diameter at its open end. A ball (not shown) is wedged into the well to entrap loosely the end of the spring.

In each of the spring mechanisms shown in FIGS. 3-8, the end of the spring which is loosely entrapped is free to move longitudinally during opening and closing of the lid. Thus, such entrapment of the spring does not interfere in any way with the biasing force normally exerted by the spring.

What we claim is:

1. A cassette including a visor-type lid having a corner part at which a pin journals the lid to a sidewall of the cassette for pivotal movement between open and closed positions of the lid relative to the sidewall, a coil spring having a helical central portion around the pin and opposite first and second end portions, and means for fixing said first end portion to said lid and said second end portion to said sidewall to bias the lid toward the closed position, wherein said means for fixing said second end portion to said sidewall comprises said sidewall including walls defining a well having an opening and opposed interior surfaces, with one of said opposed interior surfaces facing toward said pin and the other of said opposed interior surfaces facing away from said pin, and said second end portion is bent to form an end part ending at a tip, which end part is positioned in said well and is at least partially under compression between said opposed interior surfaces of the well to bias the tip into engagement with one of said opposed interior surfaces while forming an obtuse angle between the portion of the end part adjacent the tip and the portion of the opposed interior surface contacted by the tip between the tip and said opening.

2. A cassette according to claim 1 wherein said well is elongate in a direction normal to said opening and said opposed interior surfaces are narrow.

3. A cassette according to claim 1 wherein said end part is generally V-shaped between said opposed interior surfaces and points away from said opening, said generally V-shaped end part having helped to guide said end part into the well when the end part was engaged with the sidewall.

4. A cassette according to claim 1 wherein said obtuse angle is between 110° and 160°.

5. A cassette acording to claim 4 wherein the opposed interior surface contacted by said tip faces away from said pin.

6. A cassette according to claim 4 wherein the opposed interior surface contacted by said tip faces toward said pin.

7. A cassette according to claim 1 wherein said walls defining said well define a rim around said opening lying in a plane essentially perpendicular to said sidewall.

8. A cassette according to claim 1 wherein said walls defining said well define a rim around said opening and have a depression from said rim through which the second end portion of the spring loosely passes.

9. A cassette according to claim 1 wherein the cassette comprises base and cover shells, each having a broad facewall and short sidewalls which abut to form a tape-reel enclosure, and said walls defining said well are included in the cover shell.

10. A cassette according to claim 9 wherein said walls defining said well define a rim around said opening and have a depression from said rim through which the second end portion of the spring loosely passes when the lid and cover shell are assembled.

11. A cassette according to claim 10 wherein part of the base shell loosely entraps the second end portion of the spring in the depression.

12. A cassette including a visor-type lid having a corner part at which a pin journals the lid to a sidewall of the cassette for pivotal movement between open and closed positions of the lid relative to the sidewall, a coil spring having a helical central portion around the pin and opposite first and second end portions, and means for fixing said first end portion to said lid and said second end portion to said sidewall to bias the lid toward the closed position, wherein said means for fixing said second end portion to said sidewall comprises said sidewall including a wall defining a surface facing away from said pin and a rim at one end of said surface, said second end portion extends past said rim and is bent to form an end part ending at a tip, which end part is positioned adjacent said surface with the tip in engagement with said surface while forming an obtuse angle between a portion of the end part adjacent the tip and a portion of the surface between the tip and said rim, and said surface and pin are spaced to place said spring under tension between said surface and said pin.

13. A cassette according to claim 12 comprising cover and base shells, each having a broad facewall and short sidwalls which abut to form a reel enclosure, with said wall defining said surface being formed in said cover shell.

14. A cassette according to claim 13 wherein said wall has a depression from said rim through which the second end portion of the spring loosely passes when the lid and cover shell are assembled.

15. A cassette according to claim 14 wherein part of the base shell entraps the second end portion of the spring loosely in the depression.

* * * * *